(12) United States Patent
Zheng et al.

(10) Patent No.: US 7,796,855 B2
(45) Date of Patent: Sep. 14, 2010

(54) ELECTRO-OPTIC POLYMER DEVICES WITH SEMICONDUCTING OLIGOMER CLADS

(76) Inventors: Lixin Zheng, 8719 NE. 124th St., Kirkland, WA (US) 98034; Danliang Jin, 18019 32nd Ave. SE., Bothell, WA (US) 98012

( * ) Notice: Subject to any disclaimer, the term of this patent is extended or adjusted under 35 U.S.C. 154(b) by 411 days.

(21) Appl. No.: 11/739,271

(22) Filed: Apr. 24, 2007

(65) Prior Publication Data

US 2008/0267571 A1    Oct. 30, 2008

(51) Int. Cl.
G02B 6/00 (2006.01)
G02B 6/06 (2006.01)
(52) U.S. Cl. .................. 385/129; 385/130; 385/141; 385/142; 385/143; 385/144; 385/145
(58) Field of Classification Search ......... 385/129–130, 385/141–145
See application file for complete search history.

(56) References Cited

U.S. PATENT DOCUMENTS 7,231,127 B2 * 6/2007 Jin .............................. 385/145
7,361,450 B2 * 4/2008 Koyanagi et al. ........ 430/287.1

* cited by examiner

*Primary Examiner*—Geraldina Visconti

(74) *Attorney, Agent, or Firm*—Christopher A. Wiklof; Graybeal Jackson LLP

(57) ABSTRACT

An electro-optic waveguide device comprising an electro-optic polymer core and at least one crosslinked polymer clad, wherein the crosslinked polymer clad is comprised of a first constitutional unit derived from a compound having the formula

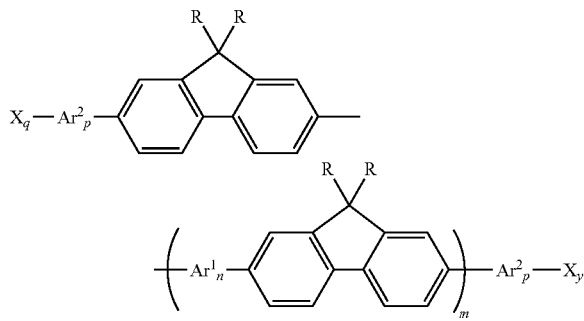

wherein, $m=0-6$; $n=0-1$; $q=1-3$; $y=0-3$; $Ar^1$ is an aryl or heteroaryl group; and independently at each occurrence $p=0-1$; R is an alkyl, heteroalkyl, aryl, or heteroaryl group; $Ar^2$ is an aryl or heteroaryl group; and X is a crosslinkable group. The R group may be an alkyl or heteroalkyl group with at least 6 atoms in a straight chain. In some embodiments, the R group is an alkoxy capped oligoalkylene group. Other embodiments include a polymer comprising a first constitutional unit derived from a compound having the formula described above.

15 Claims, 4 Drawing Sheets

ELECTRO-OPTIC POLYMER DEVICES WITH SEMICONDUCTING OLIGOMER CLADS

BACKGROUND

All patents, patent applications, and publications cited within this application are incorporated herein by reference to the same extent as if each individual patent, patent application or publication was specifically and individually incorporated by reference.

Electro-optic polymer modulators and devices are useful for a variety of applications in optical communications. The velocity of light and the velocity of micro and millimeter waves are closely matched in polymers, which enables devices having broad bandwidth. Electro-optic polymers have high electro-optic activity, which may lead to optical modulators and devices that have low drive voltage. Low drive voltage modulators are the critical component in RF photonic applications such as antenna remoting, phased array radar, and avionics. However, realizing the high electro-optic activity of polymers in optical devices is difficult because the passive polymers used as optical waveguide clads shield the electro-optic polymer from the electric field during poling, which decreases the electro-optic activity substantially. Some groups have attempted to use conducting polymers as waveguide clads to allow the electric field to fall on the electro-optic polymer, but conducting polymers are not soluble or processable enough to fabricate practical devices. Other groups have introduced salts into the organic polymer, but inorganic salts are not very soluble in the organic polymer, which again makes processing and device fabrication difficult. A clad polymer that has reduced resistivity and is also processable is needed to realize the fill potential of electro-optic polymer devices.

SUMMARY

One embodiment is an electro-optic waveguide device comprising an electro-optic polymer core and at least one crosslinked polymer clad, wherein the crosslinked polymer clad is comprised of a first constitutional unit derived from a compound having the formula

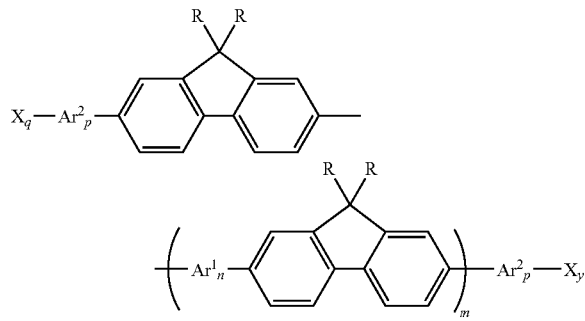

wherein, m=0-6; n=0-1; q=1-3; y=0-3; $Ar^1$ is an aryl or heteroaryl group; and independently at each occurrence p=0-1; R is an alkyl, heteroalkyl, aryl, or heteroaryl group; $Ar^2$ is an aryl or heteroaryl group; and X is a crosslinkable group. The R group may be an alkyl or heteroalkyl group with at least 6 atoms in a straight chain. In some embodiments, the R group is an alkoxy capped oligoalkylene group. Other embodiments include a polymer comprising a first constitutional unit derived from a compound having the formula described above.

DETAILED DESCRIPTION

Figure 1:
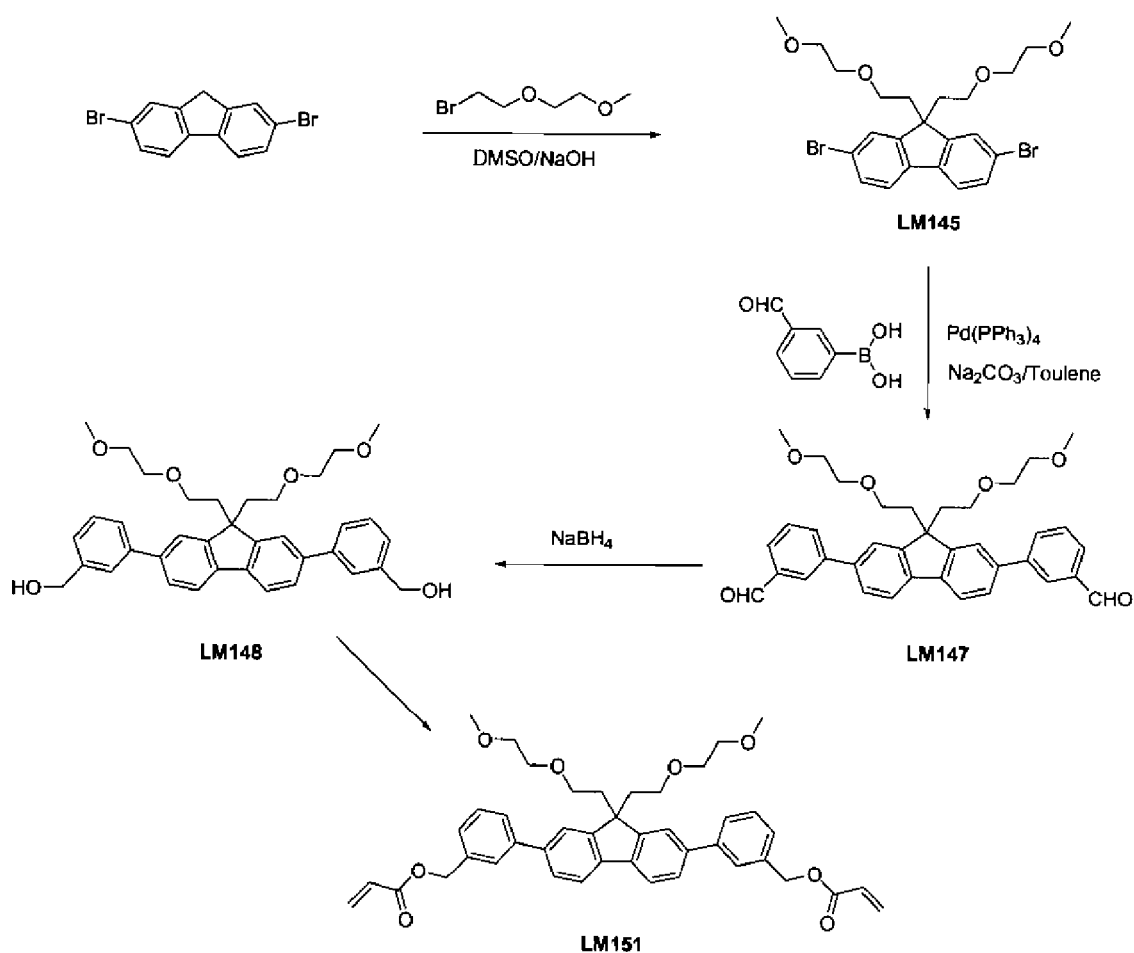
FIG. 1 shows the synthesis of constitutional unit comprising some embodiments.

One embodiment is an electro-optic waveguide device comprising an electro-optic polymer core and at least one crosslinked polymer clad, wherein the crosslinked polymer clad is comprised of a first constitutional unit derived from a compound having the formula

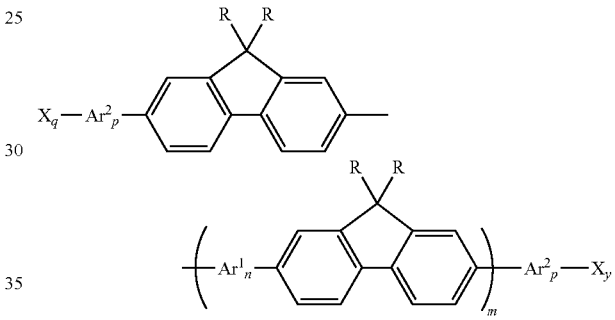

wherein, m=0-6; n=0-1; q=1-3; y=0-3; $Ar^1$ is an aryl or heteroaryl group; and independently at each occurrence p=0-1; R is an alkyl, heteroalkyl, aryl, or heteroaryl group; $Ar^2$ is an aryl or heteroaryl group; and X is a crosslinkable group. The R group may be an alkyl or heteroalkyl group with at least 6 atoms in a straight chain. In some embodiments, the R group is an alkoxy capped oligoalkylene group such as a 2-(2-methoxyethoxy) ethyl group; a 2-[2-(2-methoxyethoxy)ethoxy]ethyl group; or a 2-(2-[2-(2-methoxyethoxy)ethoxy]ethoxy)ethyl group. The alkoxy capped oligoalkylene group increases the processability of the crosslinked polymer clad. Electro-optic polymers and fabricating an electro-optic polymer devices including a crosslinked polymer clad have been described, for example, in U.S. Pat. Nos. 7,161,726; 6,895,162; and 6,750,603. The crosslinkable group may comprise an acid labile group, a radical labile group, or a thermally labile group. In some embodiments, the crosslinkable group is an epoxide or an acrylate.

In one embodiment, n=0; p=0; q=1-3; y=1-3; and m=0-6. In another embodiment, n=0; p=0; q=1-3; y=1-3; and m=0-6, and the crosslinkable group is an acrylate and R is an alkoxy capped oligoalkylene group. In one embodiment, m=0-6; n=0-1; q=1-3; y=1-3; and p=1. In another embodiment, m=0-6; n=0-1; q=1-3; y=1-3, and $Ar^1$ is a phenyl group; $Ar^2$ is a phenyl group; and R is an alkoxy capped oligoalkylene group. In one embodiment, m=1-6; n=1; p=0-1; q=1-3; and y=1-3. In another embodiment, m=1-6; n=1; p=0-1; q=1-3; and y=1-3, and $Ar^2$ is an aryl group, and R is an alkoxy capped oligoalkylene group. In another embodiment, m=1-6; n=1; p=0-1;

q=1-3; and y=1-3, and $Ar^2$ is an aryl group, and R is an alkoxy capped oligoalkylene group, and $Ar^1$ has the formula

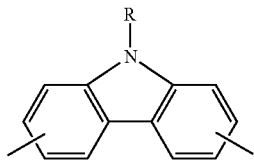

Other embodiments, the crosslinked polymer clad of the electro-optic device described above further comprises a second constitutional unit comprising a halocatechol diacrylate, a haloresorcinol diacrylate, a halohydroquinone diacrylate, or an oligoalkylene diacrylate. In some embodiment, the weight percent of the second constitutional unit is from 10-50% of the crosslinked polymer clad.

Another embodiment is a polymer comprising a first constitutional unit derived from a compound having the formula

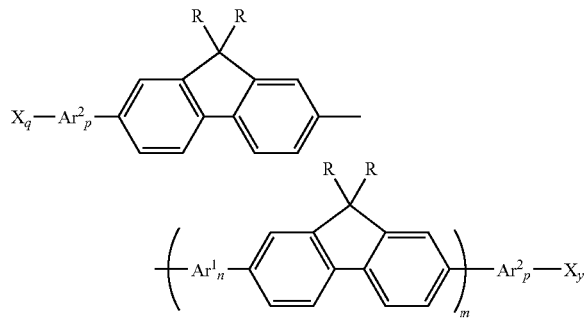

wherein, m=0-6; n=0-1; q=1-3; y=0-3; $Ar^1$ is an aryl or heteroaryl group; and independently at each occurrence p=0-1; R is an alkyl, heteroalkyl, aryl, or heteroaryl group; $Ar^2$ is an aryl or heteroaryl group; and X is a crosslinkable group. The R group may be an alkoxy capped oligoalkylene group such as an alkoxy capped oligoalkylene group; a 2-(2-methoxyethoxy) ethyl group; a 2-[2-(2-methoxyethoxy)ethoxy]ethyl group; or a 2-(2-[2-(2-methoxyethoxy)ethoxy]ethoxy)ethyl group. In some embodiments, the crosslinkable group may be an acrylate. Crosslinked polymers comprising a constitutional unit derived from a compound having the formula described above may be useful in devices such as electro-optic polymer modulators, organic light emitting diodes, organic field effect transistors, and organic photovoltaics.

In one embodiment, the polymer has n=0; p=0; q=1-3; y=1-3; and m=0-6. In a related embodiment, the crosslinkable group is an acrylate and R is an alkoxy capped oligoalkylene group. In one embodiment, the polymer has m=0-6; n=0-1; q=1-3; y=1-3; p=1. In another embodiment when the polymer has m=0-6; n=0-1; q=1-3; y=1-3; p=1, $Ar^1$ is a phenyl group; $Ar^2$ is a phenyl group; and R is an alkoxy capped oligoalkylene group. In another embodiment of the polymer, m=1-6; n=1; p=0-1; q=1-3; and y=1-3. In one embodiment, where m=1-6; n=1; p=0-1; q=1-3; and y=1-3, $Ar^2$ is an aryl group, and R is an alkoxy capped oligoalkylene group. One embodiment of the polymer is where m=1-6; n=1; p=0-1; q=1-3; and y=1-3, $Ar^2$ is an aryl group, and R is an alkoxy capped oligoalkylene group, and $Ar^1$ has the formula

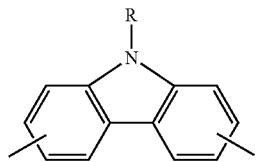

In other embodiments, the polymer further comprises a second constitutional unit comprising a halocatechol diacrylate, a haloresorcinol diacrylate, a halohydroquinone diacrylate, or an oligoalkylene diacrylate. In the embodiments, the weight percent of the second constitutional unit may be, for example, from 10-50% of the crosslinked polymer comprising the first constitutional unit.

EXAMPLES

The following example(s) is illustrative and does not limit the Claims.

Material Synthesis

Synthesis of LM151 (FIG. 1)

LM145: To a solution of 2,7-dibromofluorene (10 g, 31 mmol), 1-bromo-2-(2-methoxyethoxy)ethane (12.5 g, 68 mmol), tetrabutylammonium bromide (2.5 g) in degassed DMSO (200 mL), was added NaOH aq. (50 wt %, 50 mL). After mechanically stirring at room temperature for overnight, the solution was quenched with water (100 mL), and solvents was distilled under vacuum. The residue solid was dissolved in $CH_2Cl_2$, and washed with HCl aq. (1 M, 100 mL×3). The organic layer was dried over $MgSO_4$, and purified by column chromatography with an elute (ethyl acetate: hexanes/2:5), to give a viscous liquid of 14.7 g (yield, 90%)

LM147: A dried flask was charged with LM145 (10.62 g, 20 mmol), 3-formylphenylboronic acid (6.64 g, 44 mmol), $Na_2CO_3$ aq. (20 wt %, 30 mL), toluene (120 mL) and 0.25 g of $Pd(PPh_3)_4$ as catalyst. The mixture was stirred under argon for 24 h at 110° C. and then poured into 300 mL of distilled water. The organic layer was dried with $MgSO_4$, and solvent was removed under reduced pressure. The crude dark oil was purified by column chromatography (ethyl acetate:hexanes, 1:1, as elute) to provide a wax-like solid of 10.2 g (yield, 88%).

LM148: To a solution of LM147 (10 g, 17 mmol) in methanol (150 mL), was added a solution of $NaBH_4$ in 7 wt % NaOH aq at 0° C. After the mixture was stirred at this temperature for 4 hr, 300 mL of distilled water was added. The mixture was extracted with ethyl acetate (200 mL×2), the combined organic layers were dried over $Na_2SO_4$, and solvent was removed to give a white solid of 9.8 g (yield, 99%). No further purification was needed.

LM151: To a solution of LM148 (13 g, 22 mmol) and triethylamine (5.2 g, 51 mmol) in $CH_2Cl_2$ (200 mL), acryloyl chloride (4.5 g, 50 mmol) was added dropwise at 0° C. The reaction was kept the temperature for 5 hr. The organic salt was filtered out, and the solution was concentrated. The crude material was purified by column chromatography (ethyl acetate as elute) to provide a wax-like solid of 12.5 g (yield, 82%).

Figure 2:
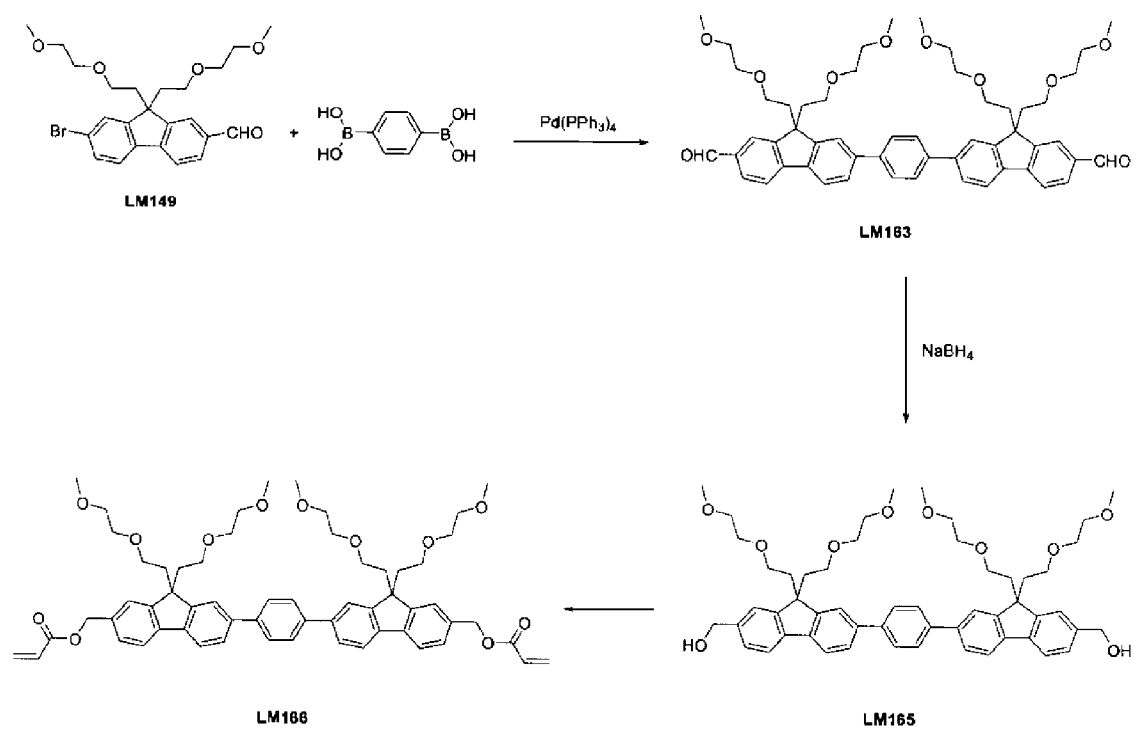
FIG. 2 shows the synthesis of another constitutional unit comprising some embodiments.

Synthesis of LM166 (FIG. 2)

LM149: To a solution of LM145 (15.75 g, 29.8 mmol) in dried THF (80 mL), n-BuLi (2.5 M, 12 mL) was added dropwise at −78° C. After two hours reaction at this temperature, 5 mL of N,N-dimethylformadyde was added. The mixture was slowly warmed up to room temperature in 8 hrs, then quenched with 10 mL of water. The organic layer was washed with water (2×50 mL) and dried with MgSO$_4$. The product was further purified by column chromatography (ethyl acetate:hexanes, 1:1, as elute) to provide a wax-like solid of 7.8 g (yield, 55%).

LM163: A dried flask was charged with LM149 (3.82 g, 8 mmol), 1,4-benzene boronic acid (0.663 g, 4 mmol), Na$_2$CO$_3$ aq. (20 wt %, 10 mL), THF (10 mL) and a catalytic amount of Pd(PPh$_3$)$_4$. The mixture was stirred under nitrogen for 24 h at 80° C. and then poured into 300 mL of distilled water. The organic layer was dried with Na$_2$SO$_4$, and solvent was removed under reduced pressure. The crude dark oil was purified by column chromatography (ethyl acetate as elute) to provide a wax-like solid of 5.2 g (yield, 75%).

LM165: To a solution of LM163 (2.6 g, 3 mmol) in methanol (30 mL), was added a solution of NaBH$_4$ (0.4 g) in 7 wt % NaOH aq at 0° C. After the mixture was stirred at this temperature for 4 hr, 300 mL of distilled water was added. The mixture was extracted with ethyl acetate (200 mL×2), the combined organic layers were dried over Na$_2$SO$_4$, and solvent was removed to give a white solid of 2.5 g (yield, 95%). No further purification was needed.

LM166: To a solution of LM165 (2.5 g, 2.9 mmol) and triethylamine (0.4 g) in CH$_2$Cl$_2$ (30 mL), acryloyl chloride (0.645 g) was added dropwise at 0° C. The reaction was kept at this temperature for 5 hr. The organic salt was filtered out, and the solution was concentrated. The crude material was purified by column chromatography (ethyl acetate as elute) to provide a wax-like solid of 2.2 g (yield, 77%).

Figure 3:
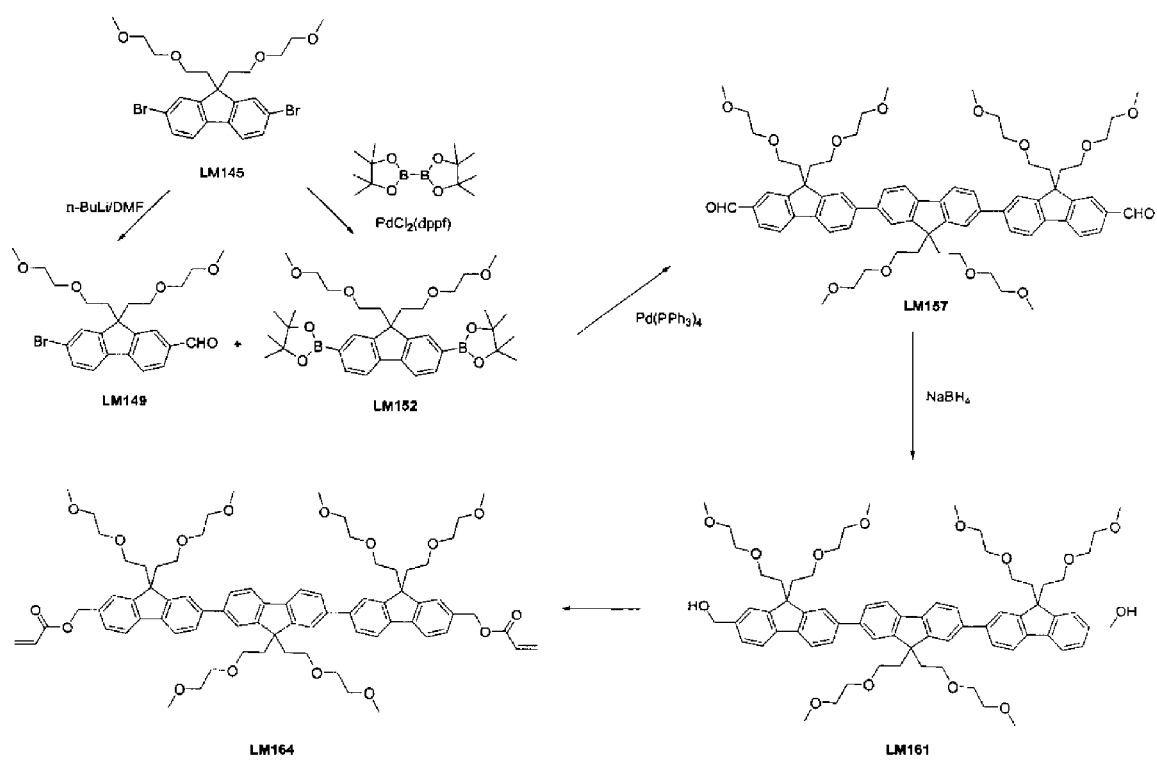
FIG. 3 shows the synthesis of a third constitutional unit comprising some embodiments.

Synthesis of LM164 (FIG. 3)

LM152: A mixture of LM145 (10.09 g, 19.1 mmol), octamethyl-2,2'-bi-dioxaborolane (10.67 g, 42 mmol), K$_2$CO$_3$ (15.84 g), Pd(dppf)Cl$_2$ (0.42 g, 3% eqv.) and dioxane (250 mL) was heated to 80° C. The reaction was kept at this temperature overnight. Next, dioxane was distilled, and the residual solid was dissolved in ethyl acetate and washed with water twice. The organic layers were dried over Na$_2$SO$_4$, and solvent was removed under a reduce pressure. The crude material was purified by column chromatography (ethyl acetate:hexanes/2:1 as elute) to provide a wax-like solid of 9.5 g (yield, 80%).

LM157: A dried flask was charged with LM152 (1.62 g, 2.6 mmol), LM149 (2.53 g, 5.3 mmol), Na$_2$CO$_3$ aq. (20 wt %, 10 mL), toluene (10 mL) and a catalytic amount of Pd(PPh$_3$)$_4$. The mixture was stirred under nitrogen for 36 h at 80° C. and then poured into 300 mL of distilled water. The organic layer was dried with Na$_2$SO$_4$, and solvent was removed under reduced pressure. The crude dark oil was purified by column chromatography (ethyl acetate and 5% methanol) to provide a wax-like solid of 2.65 g (yield, 87%).

LM161: To a solution of LM157 (2.0 g, 1.7 mmol) in methanol (20 mL) was added a solution of NaBH$_4$ (0.14 g) in 7 wt % NaOH aq at 0° C. After the mixture was stirred at this temperature for 4 hr, 300 mL of distilled water was added. The mixture was extracted with ethyl acetate (200 mL×2), the combined organic layers were dried over Na$_2$SO$_4$, and solvent was removed to give a white solid of 1.9 g (yield, 95%). No further purification was needed.

LM164; To a solution of LM161 (1.8 g, 1.5 mmol) and triethylamine (0.3 g,) in CH$_2$Cl$_2$ (30 mL), acryloyl chloride (0.25 ml) was added dropwise at 0° C. The reaction was kept at this temperature for 6 hr. The organic salt was filtered out, and the solution was concentrated. The crude material was purified by column chromatography (ethyl acetate as elute) to provide a wax-like solid of 1.4 g (yield, 71%).

Figure 4:
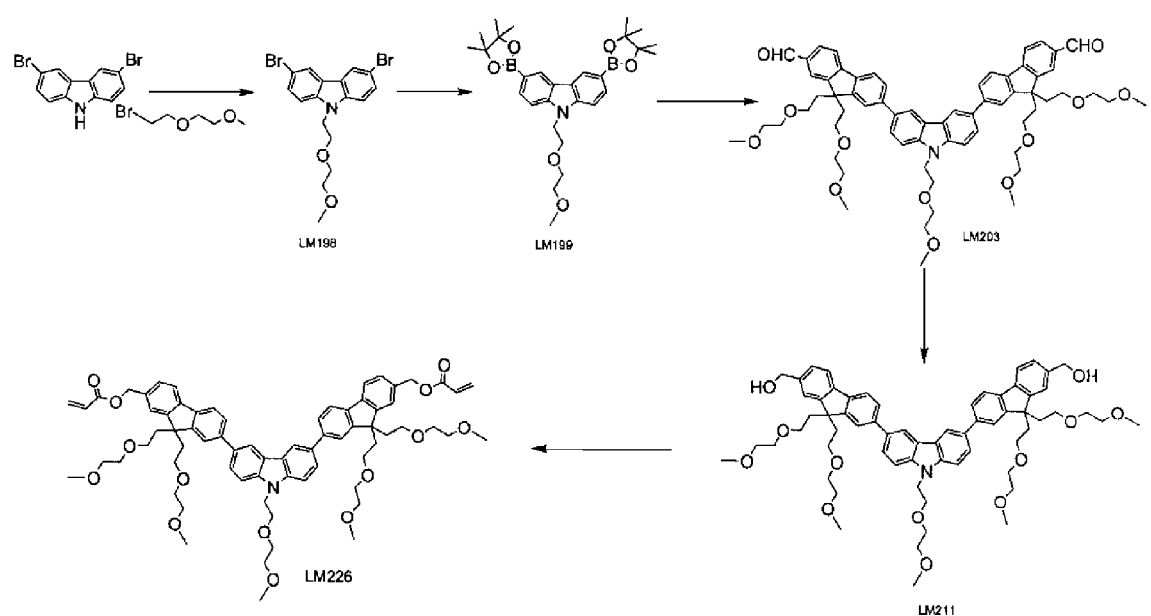
FIG. 4 shows the synthesis of fourth constitutional unit comprising some embodiments.

Synthesis of LM226 (FIG. 4)

LM198: A mixture of 3,6-dibromocarbazole (4.7 g, 14.5 mmol) and 1-bromo-2-(2-methoxyethoxy)ethane (2.9 g, 15.8 mmol), NaOH (0.7 g), and tetrabutylammonium bromide (0.1 g) in acetone (170 mL) was heated to reflux overnight. The mixture was diluted with CH$_2$Cl$_2$ (200 mL) and washed with water (100 mL×2). The organic layer was dried with Na$_2$SO$_4$ and solvent was removed. The crude material was purified by column chromatography (CH$_2$Cl$_2$:Hexanes/9:1 as elute) to provide an oil of 5.4 g (yield, 90%).

LM199: A mixture of LM198 (5 g, 12 mmol), octamethyl-2,2'-bi-dioxaborolane (6.25 g, 13.8 mmol), K$_2$CO$_3$ (5 g), Pd(dppf)Cl$_2$ (0.5 g, 3% eqv.) and dioxane (40 mL) was heated to 80° C. The reaction was kept at this temperature overnight. Next, dioxane was distilled, and the residual solid was dissolved in ethyl acetate and washed with water twice. The organic layers were dried over Na$_2$SO$_4$, and solvent was removed under a reduced pressure. The crude material was purified by column chromatography (ethyl acetate: CH$_2$Cl$_2$/1:1 as elute) to provide a wax-like solid of 4.6 g (yield, 78%).

LM203: A dried flask was charged with LM199 (3.12 g, 6 mmol), LM149 (6.0 g, 12.6 mmol), Na$_2$CO$_3$ aq. (20 wt %, 30 mL), THF (50 mL) and a catalytic amount of Pd(PPh$_3$)$_4$. The mixture was stirred under nitrogen for 36 h at 80° C. and then poured into 300 mL of distilled water. The organic layer was dried with Na$_2$SO$_4$, and solvent was removed under reduced pressure. The crude dark oil was purified by column chromatography (ethyl acetate and 5% methanol) to provide a wax-like solid of 3.0 g (yield, 50%).

LM211: To a solution of LM203 (3.0 g, 2.8 mmol) in methanol (20 mL) was added a solution of NaBH$_4$ (0.5 g) in 7 wt % NaOH aq at 0° C. After the mixture was stirred at this temperature for 4 hr, 300 mL of distilled water was added. The mixture was extracted with ethyl acetate (200 mL×2), the combined organic layers were dried over Na$_2$SO$_4$, and solvent was removed to give a white solid of 2.9 g (yield, 95%). No further purification was needed.

LM226: To a solution of LM211 (3.1 g, 2.9 mmol) and triethylamine (1.0 g) in CH$_2$Cl$_2$ (50 mL), acryloyl chloride (0.66 ml) was added dropwise at 0° C. The reaction was kept at this temperature for 6 hr. The organic salt was filtered out, and the solution was concentrated. The crude material was purified by column chromatography (ethyl acetate as elute) to provide a wax-like solid of 2.5 g (yield, 74%).

4-Chloro-1,3-phenylene diacrylate (CPDA): To a solution of 4-chlororesorcinol (86.76 g, 0.60 mol) in anhydrous THF (750 mL) in a 2-liter three neck round bottom flask equipped with dry nitrogen purge, thermo-couple, condenser, and ice-water bath, triethylamine (163.6 g, 1.62 mol) in anhydrous THF (100 mL) was added dropwise in 10 minutes. After 10 minutes, acryloyl chloride (136 g, 1.5 mol) in anhydrous THF (300 mL) was added dropwise in 30-60 minutes (maintain 0-5C of the solution). A precipitate formed immediately, and the mixture was warmed to room temperature and stirred overnight (.about. 15 hrs). The resulting mixture was filtered to remove the solid, and the filtrate was concentrated by rotary evaporation to give a darkly colored viscous liquid. The liquid was dissolved in methylene chloride (200 mL), cooled in an ice bath, washed with 1.0 N sodium hydroxide until pH>10, washed with 1.0 N HCl until pH<2, washed with DI water until pH>5, and dried over anhydrous sodium sulfate. The compound was purified by column chromatography and vacuum concentrated at room temperature to give a pale yellow or colorless liquid.

Film Preparation Examples

In one example, 1.36 g (70 wt %) of LP166, 0.6 g (30 wt %) of CPDA, and 0.02 g (1 wt %) of a photoinitator: (2-methyl-4'-methylthio-2morpholinopiophenone) were dissolved in dibromomethane (12 g). The resulting solution was spin deposited on a glass substrate at 500 rpm for 5 seconds, followed by 1000 rpm for 20 seconds. The film was UV cured on a conveyor belt. The thickness of the resulting film was 3.02 microns.

In another example, 2 g of LP166 and 0.06 g (3%) of a photoinitator (2-methyl-4'-methylthio-2 morpholinopiophenone) were dissolved in cyclopentanone (10 g). The resulting solution was spin deposited on a glass substrate at 500 rpm for 5 seconds, followed by 1000 rpm for 20 seconds. The film was UV cured on a conveyor belt. The thickness of the resulting film was 2.11 microns.

Refractive Index of Thin Films

| Material | n @ 1310 nm | n @ 1550 nm |
| --- | --- | --- |
| LM166 | 1.6019 | 1.6030 |
| 70% LM166 & 30% CPDA | 1.5854 | 1.5838 |
| 70% LM166 & 30% Ethylene Glycol diacrylate | 1.5500 | |
| LM151 | 1.6046 | 1.6007 |

Other embodiments are within the following claims.

The invention claimed is:

1. An electro-optic waveguide device comprising an electro-optic polymer core and at least one crosslinked polymer clad, wherein the crosslinked polymer clad is comprised of a first constitutional unit derived from a compound having the formula

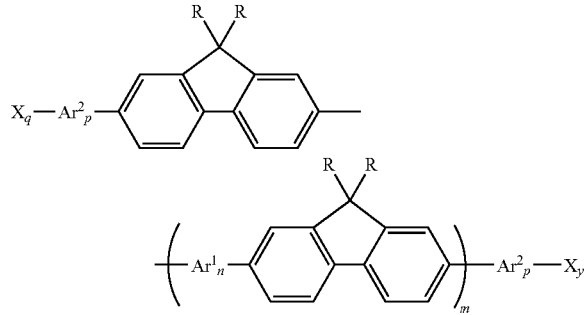

wherein, $m=0-6$; $n=0-1$; $q=1-3$; $y=0-3$; $Ar^1$ is an aryl or heteroaryl group; and independently at each occurrence $p=0-1$; R is an alkyl, heteroalkyl, aryl, or heteroaryl group; $Ar^2$ is an aryl or heteroaryl group; and X is a crosslinkable group.

2. The electro-optic device of claim 1, wherein each R is an alkyl or heteroalkyl group with at least 6 atoms in a straight chain.

3. The electro-optic device of claim 2, wherein at least one R is an alkoxy capped oligoalkylene group.

4. The electro-optic device of claim 3, wherein the alkoxy capped oligoalkylene group is a 2-(2-methoxyethoxy) ethyl group; a 2-[2-(2-methoxyethoxy)ethoxy]ethyl group; or a 2-(2-[2-(2-methoxyethoxy)ethoxy]ethoxy) ethyl group.

5. The electro-optic device of claim 1, wherein the crosslinkable group is an acid labile group, a radical labile group, or a thermally labile group.

6. The electro-optic device of claim 5, wherein the crosslinkable group is an epoxide or an acrylate.

7. The electro-optic device of claim 1, wherein $n=0$; $p=0$; $q=1-3$; $y=1-3$; and $m=0-6$.

8. The electro-optic device of claim 7, wherein the crosslinkable group is an acrylate and R is an alkoxy capped oligoalkylene group.

9. The electro-optic device of claim 1, wherein $m=0-6$, $n=0-1$; $q=1-3$; $y=1-3$; and $p=1$.

10. The electro-optic device of claim 9, wherein $Ar^1$ is a phenyl group; $Ar^2$ is a phenyl group; and R is an alkoxy capped oligoalkylene group.

11. The electro-optic device of claim 1, wherein $m=1-6$; $n=1$; $p=0-1$; $q=1-3$; and $y=1-3$.

12. The electro-optic device of claim 11, wherein $Ar^2$ is an aryl group, and R is an alkoxy capped oligoalkylene group.

13. The electro-optic device of claim 12, wherein $Ar^1$ has the formula

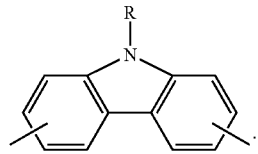

14. The electro-optic device of claim 1, wherein the crosslinked polymer clad further comprises a second constitutional unit comprising a halocatechol diacrylate, a haloresorcinol diacrylate, a halohydroquinone diacrylate, or an oligoalkylene diacrylate.

15. The electro-optic device of claim 14, wherein the weight percent of the second constitutional unit is from 10-50% of the crosslinked polymer clad.

* * * * *